D. PAOLUCCI.
DEVICE FOR CUTTING OR FORMING MOLDING STRIPS.
APPLICATION FILED JAN. 6, 1914.
1,124,509.
Patented Jan. 12, 1915.
3 SHEETS—SHEET 1.
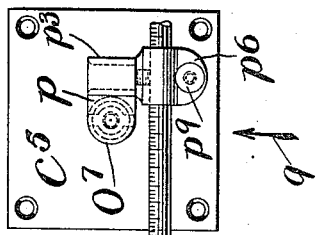
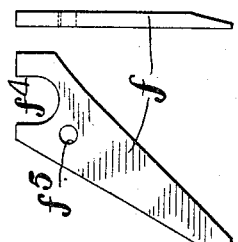
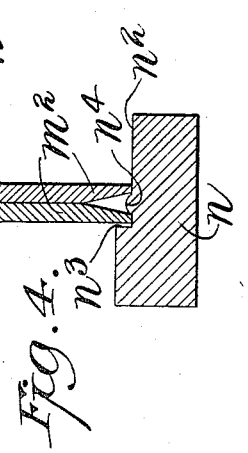
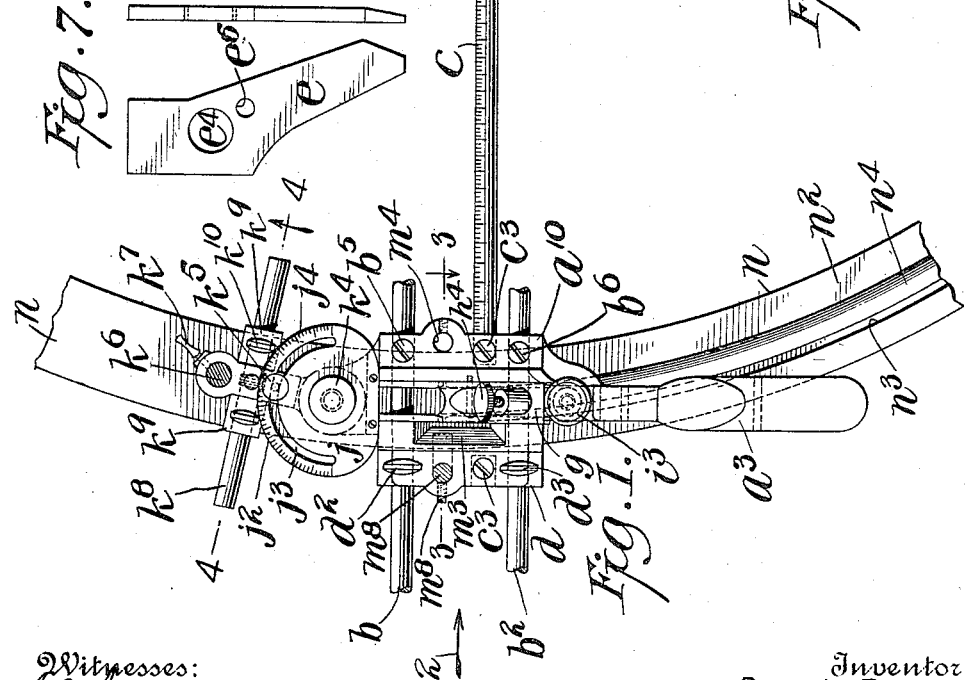
Witnesses:
A. R. Appleman
W. H. Hawkins
Inventor
Donato Paolucci,
By his Attorneys

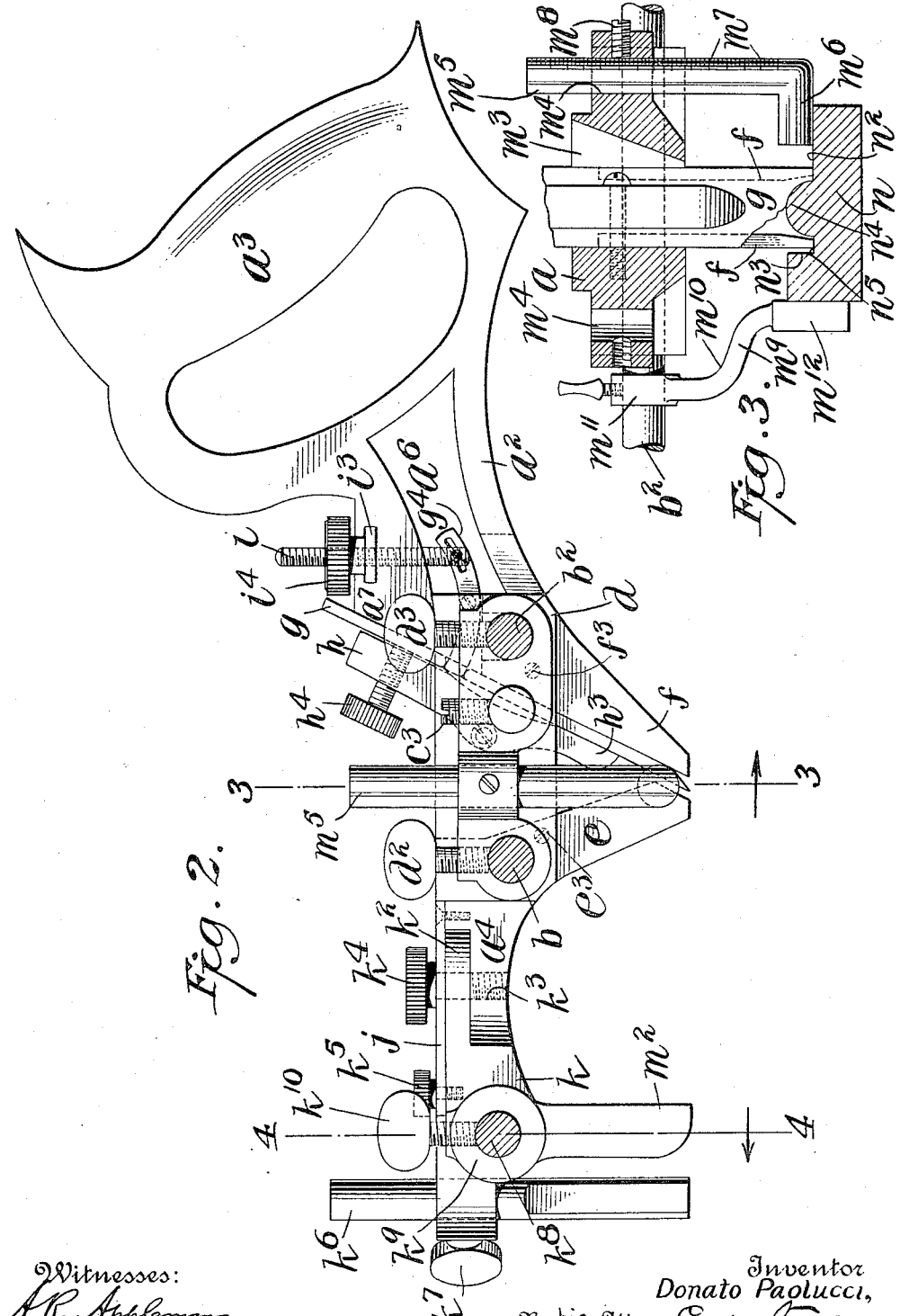

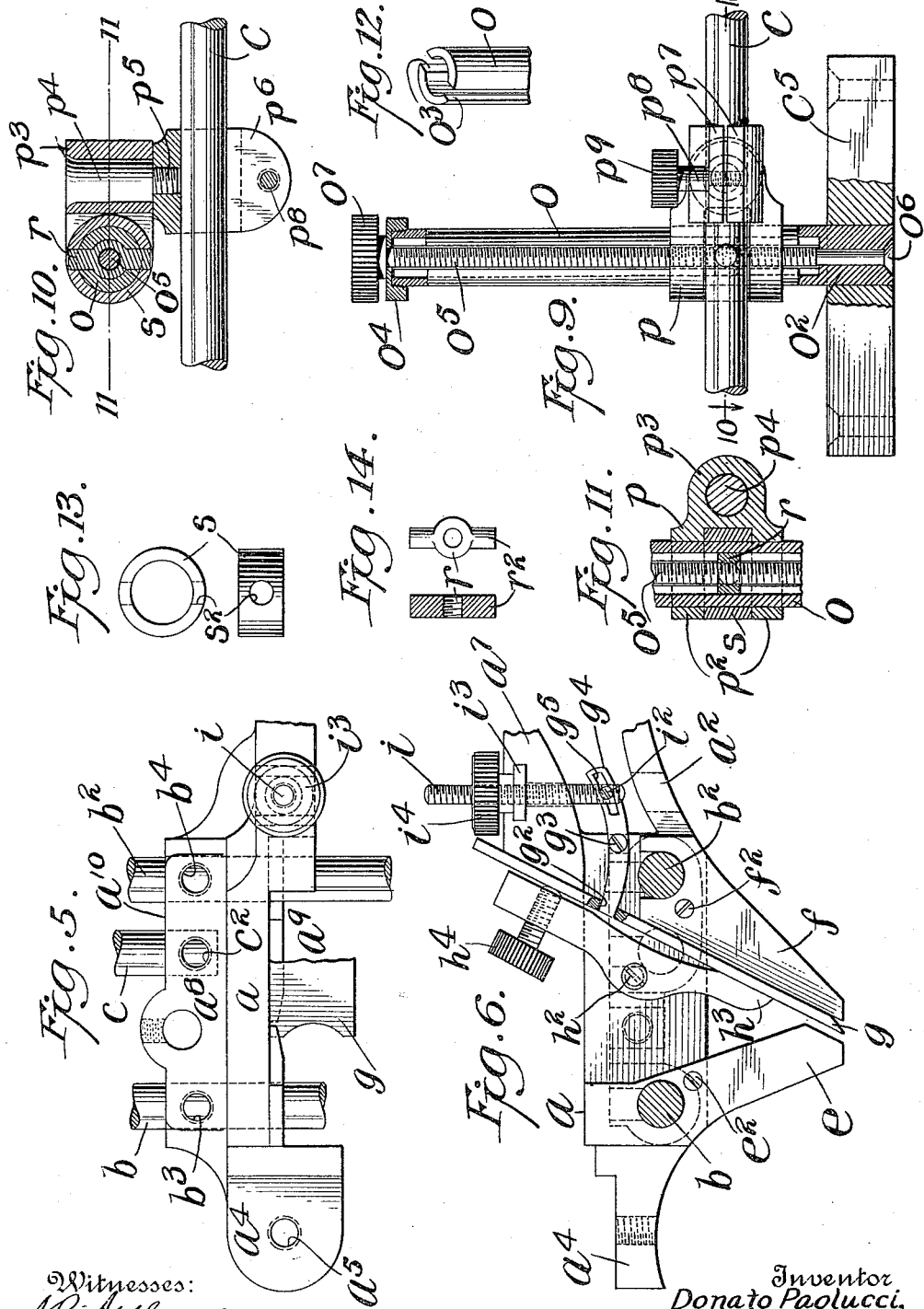

UNITED STATES PATENT OFFICE.

DONATO PAOLUCCI, OF NEW YORK, N. Y.

DEVICE FOR CUTTING OR FORMING MOLDING-STRIPS.

1,124,509.

Specification of Letters Patent.

Patented Jan. 12, 1915.

Application filed January 6, 1914. Serial No. 810,569.

*To all whom it may concern:*

Be it known that I, DONATO PAOLUCCI, a citizen of the United States, and residing at New York, in the county of New York and State of New York, have invented certain new and useful Improvements in Devices for Cutting or Forming Molding-Strips, of which the following is a specification, such as will enable those skilled in the art to which it appertains to make and use the same.

This invention relates to devices, tools or implements for cutting or forming molding strips for use in decorating or finishing the wood work of buildings of various kinds and classes, and the object thereof is to provide an improved device or tool of this class particularly adapted to be operated by hand in the manner of a plane, and to cut or form curved, as well as straight, molding strips, and with this and other objects in view, the invention consists in a device of the class specified, constructed as hereinafter described and claimed.

The invention is fully disclosed in the following specification, of which the accompanying drawings form a part, in which the separate parts of my improvement are designated by suitable reference characters in each of the views, and in which:—

Figure 1 is a plan view of my improved mold cutting device and showing the method of its operation on a work piece; Fig. 2 a side view on an enlarged scale and looking in the direction of the arrow 2 of Fig. 1, but omitting the work piece; Fig. 3 a transverse vertical section on the lines 3—3 of Figs. 1 and 2, and showing the work piece; Fig. 4 a transverse vertical section on the lines 4—4 of Figs. 1 and 2, and on the same scale as Fig. 2; Fig. 5 a plan view of the construction shown in Fig. 6 with certain parts removed; Fig. 6 a view similar to Fig. 2, but showing only part of the device, with one part removed; Fig. 7 a side and edge view of a detachable jaw plate, shown in position in Figs. 1, 2, 5 and 6; Fig. 8 a side and edge view of another detachable jaw plate shown in position in Figs. 1, 2, 5 and 6; Fig. 9 a view looking in the direction of the arrow 9 of Fig. 1, and showing an attaching bed plate and parts connected therewith, and partly in section; Fig. 10 a section on the line 10—10 of Fig. 9; Fig. 11 a section on the line 11—11 of Fig. 10; Fig. 12 a perspective detail view of a tubular post shown in position in Fig. 9, and shown in section in Figs. 10 and 11; Fig. 13 an end and side view of a bushing ring shown in section in Figs. 10 and 11, and in dotted lines in Fig. 9, and Fig. 14 a sectional and side view of a lock pin, shown in section in Figs. 10 and 11, and one end of which is shown in full lines in Fig. 9.

In carrying my invention into effect, I provide a tool body or stock comprising a central portion $a$ provided at its rear end with a backwardly directed and upwardly curved neck portion $a^2$ having a handle $a^3$ preferably in the form of the handle of a saw, and at its front end with a projecting head $a^4$ rounded on its outer side and provided with a central pivot pin hole $a^5$.

The neck portion $a^2$ is provided with a central longitudinal opening $a^6$ above which is a raised shoulder $a^7$, and said central stock or body portion is also provided at the back thereof with an oblong shoulder or projection $a^8$, and at the front thereof with a corresponding oblong recess $a^9$, and mounted in and movable horizontally through the central stock or body portion $a$, and through the oblong shoulder $a^8$ at the bottom thereof is a front pin $b$ and a rear pin $b^2$, and the top portion of the shoulder or projection $a^8$ is provided with set screw holes $b^3$ and $b^4$ through which are passed set screws $b^5$ and $b^6$ for holding the pins $b$ and $b^2$ at any desired point of adjustment.

The back of the shoulder $a^8$ is also provided with a horizontal socket or recess $a^{10}$ adapted to receive one end of a guide and operating rod $c$, shown in operative position in Fig. 1, and which will be hereinafter fully described, and the shoulder $a^8$ is also provided with a set screw hole $c^2$ through which is passed a set screw $c^3$, by means of which the tool is secured to the rod $c$.

A supplemental front stock member $d$ is placed in the recess $a^9$ at the front of the main central stock member $a$, and the pins $b$ and $b^2$ pass through this supplemental stock member $d$, and said supplemental stock member is secured to said pins by set screws $d^2$ and $d^3$, this construction being clearly shown in Figs. 1, 2 and 5.

Mounted between the main central stock member $a$ and the front supplemental stock member $d$ are detachable jaw plates $e$ and $f$, and said detachable plates $e$ and $f$ are arranged in transverse pairs, two of each being employed, and the pins $b$ and $b^2$ pass through the top or head portion of the jaw members or plates $e$ and $f$, and the lower ends of these jaw members or plates form guides for the cutter blade in the operation of the tool, as hereinafter described. The back side detachable jaw or plate members $e$ and $f$ are secured to the main stock member $a$ by screws $e^2$ and $f^2$, while the front side detachable jaw or plate members $e$ and $f$ are secured to the supplemental stock member $d$ by corresponding screws $e^3$ and $f^3$, the screws $e^2$ and $f^2$ being shown in full lines in Fig. 6, and the screws $e^3$ and $f^3$ in dotted lines in Fig. 2.

Two of the detachable jaw or plate members $e$ and $f$ are shown in Figs. 7 and 8, and are provided respectively one with a hole $e^4$ through which the pin $b$ passes, and the other with a recess $f^4$ through which the pin $b^2$ passes, and said jaw or plate members are also provided respectively with screw holes $e^5$ and $f^5$ through which the screws $e^2$—$e^3$ and $f^2$—$f^3$ are passed.

Mounted between the parts $a$ and $d$ of the main central stock or body portion and ranging downwardly and forwardly, is the cutter blade $g$, and said cutter blade rests on and is supported by the transverse jaw or plate members $f$, and also rests on the raised shoulder $a^7$ of the neck portion of the main stock or body, and by reason of the fact that the front side stock member $d$ is adjustable on the pins $b$ and $b^2$, cutter blades of different widths may be employed.

A lock lever $h$ is pivoted between the central stock members $a$ and $d$, as shown at $h^2$, and the lower end $h^3$ thereof bears on the lower end portion of the blade $g$, and passed through the upper end portion of said lock lever is a set screw $h^4$ which bears on the upper end portion of the blade $g$. This construction being well known and forming no part of my invention. The blade $g$ is also provided with an aperture or slot $g^2$, and pivoted rearwardly of said blade at $g^3$ is an arc-shaped lever $g^4$ the front end of which passes through said aperture, and the rear end of which is provided with a longitudinal slot $g^5$, and passed downwardly through the raised shoulder $a^7$ of the neck portion of the stock is a screw $i$ provided with a pin or similar device $i^2$ which passes through the slot $g^5$, and the screw $i$ is provided with a lock nut $i^3$ which is set into the stock member $a^7$ and holds said screw in said stock member and said nut $i^3$ is provided with a milled head $i^4$ and by turning said nut by means of the milled head $i^4$ thereof, the screw $i$ may be raised or lowered as desired, and this movement of said screw will operate the lever $g^4$ to raise or lower the cutter blade $g$, as may be desired, and this construction is also old and well known.

Secured to the front end portion of the main central stock member $a$ and over the forwardly projecting head $a^4$ thereof is a gage plate $j$ having a circular front portion $j^2$ in which is formed an arc-shaped slot $j^3$, and the circular front portion $j^2$ is provided with a degree scale $j^4$. The main central stock member $a$ is also provided with a front supplemental head portion $k$ having a disk $k^2$ which fits between the plate $j$ and the projecting head portion $a^4$, and a screw $k^3$ is passed through the head portion $a^4$ and through the disk $k^2$ and through the plate $j$, and provided with a milled nut $k^4$, and said supplemental head portion $k$ is free to rotate or turn on said screw.

A lock screw $k^5$ is passed downwardly through the slot $j^3$ in the plate $j$ and into the supplemental head $k$ and serves as a lock screw for holding said supplemental head at any desired point of adjustment, or at any desired angle to the plane of the main stock portion.

A pin $k^6$ is passed vertically through the end portion of the supplemental head member $k$ and is vertically adjustable therein, and may be locked in any desired position by a set screw $k^7$, and passed horizontally through the supplemental head member $k$ forwardly of the pin $k^6$ is a pin $k^8$ on the opposite sides of which are mounted angle plates $m$ held in place by blocks $k^9$ mounted on said pin $k^8$ and provided with set screws $k^{10}$ and the blocks $k^9$ are preferably welded to the angle plates $m$, and said angle plates $m$ are provided with downwardly directed guide members or jaws $m^2$.

The central supplemental stock member $d$ is provided with a large central recess $m^3$, shown in Figs. 1 and 3, to permit the cuttings of the blade $g$ to pass freely upwardly, backwardly and through the stock, and both the central stock members $a$ and $d$ are provided between the pin $b$ and the connection of the rod $c$ with vertical apertures $m^4$, and a depth gage rod $m^5$ having a bottom foot piece $m^6$ may be passed through either of these apertures, as clearly shown in Fig. 3, and used on either side of the main central stock portion of the tool in the operation thereof, as hereinafter described, and said rod $m^5$ is provided with a suitable scale $m^7$ and may be held in any desired position in the stock, or the separate parts thereof, by a set screw $m^8$, and the gage rod $m^5$ may be used in cutting or forming either curved or straight molding strips. I also provide a side guide $m^9$ for use when cutting or forming straight molding strips only, and this device consists of a curved arm $m^{10}$ having a head $m^{11}$ through which the pins $b$ or $b^2$ may be passed, and said arm is provided at its lower end with a foot piece $m^{12}$ adapted to bear on a molding strip $n$, as shown in Fig. 3, and the depth gage $m^5$ is also adapted to operate in connection with said molding strip, as shown in said figure.

The method of using my improved tool or instrument for cutting or forming curved molding strips is shown in Fig. 1, and in this operation, the rod $c$ is used as a radius, and as a guide for the tool or instrument, and said rod is provided with a scale $c^4$ and is rotatably connected with a base plate or support $c^5$ secured, in practice, to a table, work bench, or any other suitable support on which the molding strip to be cut or formed is also placed.

The method of or means for connecting the rod $c$ with the support or plate $c^5$ is shown in detail in Figs. 9 to 14 inclusive, and this connection is such as to permit of the free rotation of the rod $c$ in a horizontal plane, and also of the vertical adjustment of said rod on the plate or support $c^5$, and this connection is also such as to permit said rod to swing in a vertical plane. In order to accomplish this result, I provide a tube $o$ which is secured in the base plate or support $c^5$, and the lower end of which is closed by a plug $o^2$. The tube $o$ is slotted vertically on opposite sides thereof, as shown at $o^3$, in Fig. 12, and is provided at its upper end with a closure cap $o^4$, and passed vertically through said tube is a screw $o^5$, the lower end of which is not threaded and is rotatable in the plug $o^2$ and provided with a head $o^6$, and the upper end of the screw $o^5$ is provided with a milled head $o^7$.

The rod $c$ is connected with a forked block $p$ mounted on the tube $o$ and comprising parallel jaws $p^2$ provided at one side with a projecting shoulder $p^3$ in which is mounted a rotary plug $p^4$ provided at one end with a screw threaded shank $p^5$ onto which is screwed a supplemental clamp block $p^6$ through which the rod $c$ passes, and said block $p^6$ consists of two parallel jaw members $p^7$ through which is passed a set screw $p^8$ provided with a milled head $p^9$, and said rod is adjustable in the block $p^6$, and may be secured in any desired position therein by means of the screw $p^8$. I also provide a nut $r$ having oppositely directed pin members $r^2$, and this nut is mounted in a ring $s$ having opposite side apertures $s^2$ through which the fingers $r^2$ of the nut $r$ are adapted to be passed. These parts are clearly shown in Figs. 10 to 14 inclusive, and said ring $s$ is greater in diameter than the nut $r$, and in practice, the nut $r$ with its fingers $r^2$ is placed in the ring $s$, as shown in Fig. 10, the said ring containing the nut is then placed between the jaws $p^2$ of the block $p$, after which the block $p$ is mounted on the tube $o$, in which operation the fingers $r^2$ of the nut $r$ pass through the slots $o^3$ in said tube, after which the cap $o^4$ is screwed onto the tube $o$, and the screw $o^5$ is then passed downwardly through the cap $o^4$ and through the tube $o$, and through the nut $r$ and through the plug $o^2$ in the bottom of said tube $o$, after which the lower end of the screw $o^5$ is headed or provided with a nut, as shown at $o^6$, and these parts are thus permanently connected, and the tube $o$ may be secured in the base plate or support $c^5$ in any desired manner.

In the operation of this device for cutting or forming curved moldings, as shown in Fig. 1, a molding strip $n$ is secured in position, and the radius of the curve thereof being known, the rod $c$ is adjusted in the clamp block $p^6$ to correspond with said radius, and the tool proper is manipulated by means of the handle $a^3$, as will be readily understood.

A cross section of the mold strip $n$, as shown in Fig. 4, shows that the inner top portion thereof is cut away to form a flat surface $n^2$, and a shoulder $n^3$ between which is a bead $n^4$. The blade $g$, shown in the drawing, is provided at its lower end with a semi-circular recess, whereby, the bead $n^4$ is formed, and in the operation of the tool, a groove $n^5$ is formed between the bead $n^4$ and the shoulder $n^3$, and the jaw plates $e$ and $f$ arranged in pairs transversely of the stock of the tool move in the groove $n^5$ and on the outer side of the bead $n^4$ and hold the tool in proper position. Before beginning this operation, the inner top portion of the strip is cut away to form the flat surface $n^2$ by a plane, the blade of which is provided with a straight edge, and another blade may be substituted for the blade $g$, shown and described for this purpose, and the rod $c$ may be so adjusted that the tool will first cut away the top inner surface of the molding strip to form the face $n^2$ of a part thereof, to the desired depth, after which the rod $c$ may be readjusted so as to bring the operative parts of the tool into the position shown in Fig. 3, in which position the bead $n^4$ may be formed, and in this operation, the depth gage $m^5$ may be employed, as will be readily understood.

Although I have shown said guide device $m^9$ in Fig. 3 of the accompanying drawings, it will be understood, as hereinbefore stated, that this guide device is intended primarily for use in cutting or forming straight molding strips, in which event, or in which operation, the rod $c$ is not employed, and the tool is used in the same manner as other tools of this class, the straight molding strip being secured to a suitable support.

The guide members $m^2$ connected with the supplemental stock head $h$ are also intended for use in cutting or forming circular molding strips, and in this operation, said guide members act or operate in connection with the bead $n^4$ as it is formed, as clearly shown in Fig. 4, and the supplemental stock head member $k$ must, in this operation, be adjusted into the desired position, which is determined by the scale $j^4$ on the plate $j$, and the parts $m$ with which the guide members $m^2$ are connected and to which the blocks $k^9$ are secured, are adjustable laterally on the pin $k^8$, and said guide members $m^2$ are thus adjustable toward and from each other, whereby they are adapted to operate in connection with a bead $n^4$ of greater or less dimensions.

The vertically adjustable pin $k^6$ in the supplemental stock head $k$ is intended for use in cutting the surface $n^2$ in the top of the molding strip in which operation, the lower end of said pin bears on said surface, and this pin aids in holding the tool in proper position as it is manipulated by hand, and to maintain the proper level thereof, and when the guide members $m^2$ are in use, in the operation of cutting or forming the bead $n^4$ on a curved molding strip, the pin $k^6$ is raised so as to be out of the way. It will also be understood, however, that the guide members $m^2$ may be employed in forming a bead on a curved molding strip, and the vertically adjustable guide or gage rod $k^6$ may also be used in cutting a flat surface on a curved molding strip, but the parts $m^2$ and $k^6$ are never both in use at the same time.

The rod $c$ is adapted to swing in a vertical plane so as to enable the moving of the tool backwardly, conveniently, in which operation, it is preferable to raise it off of the work piece, and said rod $c$ is vertically adjustable on the tube $o$ in order to adapt the tool and rod to molding strips of different thicknesses, and it will be understood that the rods $c$ may be of any desired length, and while I have shown and described the preferred method of, and means for, connecting the rod $c$ with a support consisting of the parts $c^5$ and $o$, it will be understood that my invention is not limited to the details of construction herein shown and described for accomplishing this object, and any suitable construction that will permit the rotation of said rod on its support or supports, and the vertical adjustment thereof, and the vertical swinging movement thereof, may be employed for this purpose, and while I have also shown and described the preferred construction of the tool proper with which the free end of the rod $c$ is connected, it will be understood that changes in and modifications of these features of the construction shown and described, may also be made within the scope of the appended claims.

The tool proper is also reversible on the rod $c$ so that it may be used with either hand by the operator, and for this purpose, the central stock portion including the part $d$ thereof, is provided with the socket $a^{10}$ on both sides thereof, and the set screw $c^3$ used in connection therewith, and it will also be seen that the depth gage $m^5$ may be employed on either side of the said central stock portion, including the part $d$, both being provided with a bore $m^4$ to receive said depth gage and corresponding set screw $m^3$ for holding it in position.

Having fully described my invention what I claim as new and desire to secure by Letters Patent is:—

1. In a tool of the class described, a central stock member provided with downwardly directed guide jaws arranged in transverse and converging pairs, and between which a vertically adjustable cutter blade is secured, said central stock member being also provided at its front end with a supplemental stock member rotatably adjustable thereon, and provided with downwardly directed supplemental guiding jaws laterally adjustable.

2. In a tool of the class described, a central stock member provided with downwardly directed guide jaws arranged in transverse and converging pairs, and between which a vertically adjustable cutter blade is secured, said central stock member being also provided at its front end with a supplemental stock member rotatably adjustable thereon, and provided with downwardly directed supplemental guiding jaws laterally adjustable, and in front thereof with a vertically adjustable gage and guide pin.

3. A tool of the class described comprising a central stock portion provided at one end with a handle and at the other end with a rotatable and adjustable head, said head being provided with downwardly directed guide jaws and with a vertically adjustable gage pin, the central stock portion being also provided with a vertically adjustable depth gage adapted for use on both sides thereof.

4. In a tool of the class described, a central stock member provided with downwardly directed guide jaws arranged in transverse and converging pairs, and between which a vertically adjustable cutter blade is secured, said central stock member being also provided at its front end with a supplemental stock member rotatably adjustable thereon, said supplemental stock member being provided with downwardly directed supplemental guiding jaws laterally adjustable and in front thereof with a vertically adjustable gage and guide pin, a guide and radius rod detachably connected with one side of the stock portion and rotatably connected with a suitable support in which it is longitudinally and vertically adjustable.

5. In a tool of the class described, a central stock member provided with downwardly directed guide jaws arranged in transverse and converging pairs, and between which a vertically adjustable cutter blade is secured, said central stock member being also provided at its front end with a supplemental stock member rotatably adjustable thereon, said supplemental stock member being provided with downwardly directed supplemental guide jaws laterally adjustable, and means adjustably connected with the central stock member to permit the planing of circular and arc-shaped grooves in a work piece.

In testimony that I claim the foregoing as my invention I have signed my name in presence of the subscribing witnesses this 3rd day of January 1914.

DONATO PAOLUCCI.

Witnesses:
C. MULREANY,
S. ANDREWS.

Copies of this patent may be obtained for five cents each, by addressing the "Commissioner of Patents, Washington, D. C."